United States Patent [19]

Banks et al.

[11] 3,966,992

[45] June 29, 1976

[54] TREATMENT OF SOYA

[75] Inventors: Philip George Banks, Manchester;
William Pringle, Altrincham, both
of England

[73] Assignee: **The British Arkady Company
Limited,** Manchester

[22] Filed: Jan. 30, 1974

[21] Appl. No.: 438,173

[30] Foreign Application Priority Data

Feb. 3, 1973 United Kingdom............... 5440/73

[52] U.S. Cl. ............................... 426/583; 426/634
[51] Int. Cl.² ....................... A23L 1/20; A23C 21/00
[58] Field of Search .......... 426/352, 356, 364, 372, 426/377, 486, 580, 634, 583, 656, 655

[56] References Cited
UNITED STATES PATENTS

| | | | |
|---|---|---|---|
| 2,173,922 | 9/1939 | Supplee | 426/356 X |
| 3,642,492 | 2/1972 | Arndt | 426/364 X |
| 3,798,339 | 3/1974 | Peng | 426/580 |

FOREIGN PATENTS OR APPLICATIONS 955,773   4/1964   United Kingdom

*Primary Examiner*—Raymond N. Jones
*Assistant Examiner*—Esther L. Massung
*Attorney, Agent, or Firm*—Lackenbach, Lilling & Siegel

[57] ABSTRACT

A process for treating soya to improve the nutritional value thereof by destroying or eliminating the trypsin inhibitor activity of the soya. The process comprises mixing soya with whey, adjusting the pH of the mixture so that it is at a pH other than the natural pH of the soya and heating the mixture.

11 Claims, No Drawings

TREATMENT OF SOYA

The present invention relates to the production of a foodstuff from whey and soya.

It is now common practice in animal husbandry to wean calves shortly after birth because the milk from cows that have recently calved is a commercially valuable product. This practice entails feeding the calves with a substitute for the milk which they would normally obtain if suckled. One constituent frequently used in such substitutes is whey, a dairy by-product commonly obtained in the manufacture of cheese.

It is common practice to dry the whey to a powder and in this state mix it with soya flour and other ingredients to provide a balanced animal foodstuff. This drying process includes various technical hazards owing to its particular composition, especially its high sugar content, and is therefore an expensive process. One of the problems of the soya flour is that it contains a trypsin inhibitor which, it is believed, reduces its nutritional value. In any event there seems to be a relationship between the nutritional value of soya and the presence or absence of trypsin inhibitor in that the nutritional value increases as the amount of trypsin inhibitor is reduced.

There have been many proposals for destroying the trypsin inhibitor in soya and one of the earliest merely consisted in heating the soya. This was never very satisfactory however because prolonged heating is required to destroy the bulk of the trypsin inhibitor and such prolonged heating destroyed the proteins in the soya as well as the trypsin inhibitor. Thus any gain in nutritional value achieved by destroying the trypsin is matched by the loss in nutritional value resulting from breakdown of the proteins.

In order to deal with this difficulty it has been proposed to carry out the heating of the soya under very carefully controlled conditions at a pH of from 8 to 9. These proposals are described, for example, in British Pat. Specifications Nos. 955773 and 1248851.

We have now discovered that the trypsin inhibitor in soya can be eliminated or destroyed without significantly affecting the quality of the proteins by heating the soya in the presence of whey under either acid or alkaline conditions.

Accordingly the present invention provides a process for eliminating or destroying the trypsin inhibitor in soya comprising mixing soya and whey, adjusting the pH of the mixture, if necessary, such that the mixture is not at the natural pH of the soya and thereafter heating the mixture.

In accordance with the present invention the soya which is to be treated to destroy or eliminate its trypsin inhibitor may be raw soya that has undergone no previous treatment to reduce the level of trypsin inhibitor therein, treated soya which still contains some trypsin inhibitor, defatted or partially defatted soya, or a concentrate or isolate of the protein obtained from soya beans which contain some trypsin inhibitor.

The soya is mixed with whey (the term whey being intended in this specification to include similar dairy by-products such as buttermilk) and the pH of the mixture is adjusted, if necessary, so that it is preferably above 7.5 or below 5.5. For adjusting the pH of the mixture to obtain alkaline conditions inorganic alkalis such as sodium hydroxide, calcium hydroxide, ammonium hydroxide, or a mixture thereof, may be added to the soya/whey mixture.

Alternatively an alkaline pH may be obtained in the mixture by the addition of urea which reacts with urease originally present in raw beans to produce ammonium hydroxide. This enzyme is inactive at pH above 9 and so this provides a useful guarantee against extremes of pH.

If acid conditions are desired, organic acids such as tartaric acid and lactic acid, or inorganic acids such as phosphoric acid, may be added to the mixture.

In some instances the pH may be reduced by the lactic acid produced by bacteria present in the whey. This is naturally limiting in its effect as the bacteria are inactive below pH 3.

It is preferred that the pH of the mixture be adjusted to neutral after heating by the addition of an alkali, such as sodium hydroxide when the mixture is acidic or by addition of an acid such as hydrochloric acid when the mixture is alkaline.

The mixture is preferably heated under pressure and the duration of the heating step depends inter alia on the temperature of pressure at which heating is carried out so that the lower the temperature or pressure the longer the mixture must be heated to eliminate the trypsin inhibitor. Generally the mixture is heated at a temperature above the boiling point of water or at a pressure equivalent thereto.

The duration of the heating step is also dependent on the shape and dimensions of the container in which the mixture is heated. For example, a large mass of mixture will take longer to reach the required temperature than a smaller mass although the time for the mixture to attain a uniform temperature may be reduced by agitation of the mixture.

In order to form an animal foodstuff the neutralised mixture is preferably dried. Thus this single drying step replaces the separate drying of the whey and soya which is required when dried whey and dried soya are mixed together as previously proposed. Further the difficulties which are encountered when drying whey due to the high sugar content thereof are to some extent mitigated since the presence of the soya, in accordance with the present invention means that the concentration of the sugars is lower than when whey alone is dried.

The methods of determination by chemical means of the trypsin inhibitor level in soya have been the subject of much research in various laboratories all over the world.

The methods used vary in their precision and reproduceability but the one used by the inventors is the most sensitive one known to them and will detect trypsin inhibitor activity when other methods fail to detect any. This method is described in British Pat. No. 1,248851 and is also described in detail by R. Delobez, R. Duterte and Mr. Rambrand in *Revue Francaise de Corps Gras*, Volume 18 No. 6 June 1971 page 381 to 389.

The importance of detecting this last small fraction of the original activity is reflected markedly by the difference in health of young animals who are fed on the products with and without this small amount of activity.

The following Examples further illustrate the invention.

EXAMPLE 1

"DO-SOY", a soya flour prepared by grinding the endosperm of soya beans to a particle size such that the material will pass through a sieve of mesh aperture 150 micron was added with mixing to whey in such a ratio that 50 g of DO-SOY was added to 350 ml. whey. Hydrochloric Acid was added with stirring until the pH of the mixture was reduced to 4.5. The resulting mixture was heated in a pressure cooker for 10 minutes at 10 p.s.i. after which the material was cooled.

In the following Examples 2–8 substantially the same procedure was adopted as in Example 1 except that the conditions were modified as indicated in the following Table 1.

TABLE I

| Example No. | Ratio of DO-SOY/WHEY w/w | pH Adjusting Reagent | pH | Heating Conditions Time Mins. | Pressure p.s.i. | |
|---|---|---|---|---|---|---|
| 2 | 2:1 | Orthophosphoric Acid | 2.0 | 15 | 10 | |
| 3 | 1:1 | Hydrochloric Acid | 5.0 | 10 | 15 | |
| 4 | 1:7 | Lactic Acid | 4.0 | 10 | 10 | |
| 5 | 1:7 | Sodium Hydroxide | 8.5 | 5 | 0 | (100°C) |
| 6 | 3:1 | Sodium Hydroxide | 8.5 | 5 | 5 | |
| 7 | 1:7 | Sodium Hydroxide | 11 | 5 | 5 | |
| 8 | 1:7 | Calcium Hydroxide | 9 | 10 | 15 | |

HI-SOY is a soya flour prepared by grinding the endosperm of soya beans to a particle size such that the material will pass through a sieve of mesh aperture 150 micron but which before grinding has been heat treated in the traditional manner with steam without adjustment of pH. This heat treatment destroys the majority of the urease but still leaves approximately 2% of the original trypsin inhibitor as determined by the method described above.

HI-SOY was treated in a manner similar to Example 1 using the following conditions.

TABLE II

| Example No. | Ratio of HI-SOY/WHEY w/w | pH Adjusting Reagent | pH | Heating Conditions Time Mins. | Pressure p.s.i. | |
|---|---|---|---|---|---|---|
| 9 | 1:7 | Orthophosphoric Acid | 4.5 | 10 | 10 | |
| 10 | 1:7 | Hydrochloric Acid | 1.0 | 5 | 10 | |
| 11 | 3:1 | Orthophosphoric Acid | 4.5 | 10 | 10 | |
| 12 | 1:7 | Hydrochloric Acid | 5.0 | 10 | 10 | |
| 13 | 1:7 | Sodium Hydroxide | 8.0 | 5 | 5 | |
| 14 | 3:1 | Sodium Hydroxide | 9.5 | 10 | 10 | |
| 15 | 1:7 | Ammonium Hydroxide | 9.0 | 5 | 5 | |
| 16 | 1:7 | Sodium Hydroxide | 11.0 | 5 | 0 | (100°C) |

Arkasoy 50, a soya flour which has been defatted before being treated and ground in a manner similar to HI-SOY, was heated in a manner similar to that used in Example 1 using the following conditions.

TABLE III

| Example No. | Ratio of Arkasoy 50/WHEY w/w | pH Adjusting Reagent | pH | Heating Conditions Time Mins. | Pressure p.s.i. |
|---|---|---|---|---|---|
| 17 | 1:7 | Sulphuric Acid | 4.5 | 5 | 10 |
| 18 | 1:7 | Lactic Acid | 4.5 | 15 | 5 |
| 19 | 2:1 | Orthophosphoric Acid | 4.5 | 10 | 10 |
| 20 | 3:1 | Sodium Hydroxide | 9.0 | 5 | 5 |
| 21 | 1:7 | Sodium Hydroxide | 8.5 | 5 | 5 |
| 22 | 3:1 | Calcium Hydroxide | 8.5 | 10 | 5 |

Grits which have been prepared in a manner similar to that described in Example 1, 9 and 17 except that the grinding has been performed to produce material which will pass a 850 mesh sieve but is retained on a 150 micron sieve were heated in a similar manner to that used in Example I using the following conditions.

TABLE IV

| Example No. | Type of Grits | Ratio of Grits/Whey | pH Adjusting Reagent | pH | Heating Conditions Time Mins. | Pressure p.s.i. |
|---|---|---|---|---|---|---|
| 23 | DO-SOY | 1:7 | Hydrochloric Acid | 4.5 | 10 | 15 |
| 24 | DO-SOY | 1:7 | Sodium Hydroxide | 9.5 | 10 | 10 |
| 25 | HI-SOY | 1:7 | Orthophosphoric Acid | 4.5 | 10 | 15 |
| 26 | HI-SOY | 1:7 | Sodium Hydroxide | 9.5 | 10 | 10 |
| 27 | ARKASOY 50 | 1:7 | Sulphuric Acid | 4.5 | 10 | 15 |
| 28 | ARKASOY 50 | 1:7 | Sodium Hydroxide | 9.0 | 10 | 10 |

EXAMPLE 29

200 g DO-SOY flour were mixed with 1,000 g of whey which had been concentrated to a level that they contained 40% w/w solids. 50% w/w Orthophosphoric Acid was added with mixing until the pH was 4.5. The resulting mixture was heated in a layer 1/2 inch deep in a shallow tray in a pressure cooker for 10 minutes at 10 p.s.i. after which the mixture was cooled.

EXAMPLE 30

50 lb HI-SOY flour was mixed with 150 lb whey. 50% Orthophosphoric Acid was added until the pH of the mixture was 4.5. This mixture was passed under a pressure of 50 p.s.i. through a tube which was steam heated to a temperature of 140°C and cooled in such a way that the material was held in the tube for 1 minute at 140°C after which the mixture passed through a pressure relief valve.

All the products of the above examples were examined for the presence of trypsin inhibitors using the method described in the above-mentioned British Pat. No. 1,248,851 and in *Revue Francaise de Corps Gras*. and found to contain no activity whatsoever.

What is claimed is:

1. A process for eliminating or destroying the trypsin inhibitor in soya without significantly affecting the quality of the soya protein, the process comprising heating a mixture comprising soya and whey at a temperature of at least the boiling point of water for a period of time and with an amount of whey sufficient to destroy or eliminate the trypsin inhibitor, and wherein the pH of the mixture is below 5.5.
2. A process as claimed in claim 1, wherein the soya is raw soya.
3. A process as claimed in claim 1, wherein the soya is soya flour.
4. A process as claimed in claim 3, wherein the soya flour has a particle size of less than 150 microns.
5. A process as claimed in claim 1, wherein the soya is soya flour obtained from heat treated soya beans.
6. A process as claimed in claim 5, wherein the soya flour has a particle size of less than 150 microns.
7. A process as claimed in claim 1, wherein the soya is soya flour obtained from defatted, heat treated soya beans.
8. A process as claimed in claim 1, wherein the soya is in the form os soya grits.
9. A process as claimed in claim 1, wherein the weight ratio of soya to whey is from 1:7 to 3:1.
10. A process as claimed in claim 1, wherein, after heating, the pH of the mixture is adjusted to substantially neutral.
11. A process as claimed in claim 1, wherein the mixture is heated under pressure.

* * * * *